UNITED STATES PATENT OFFICE.

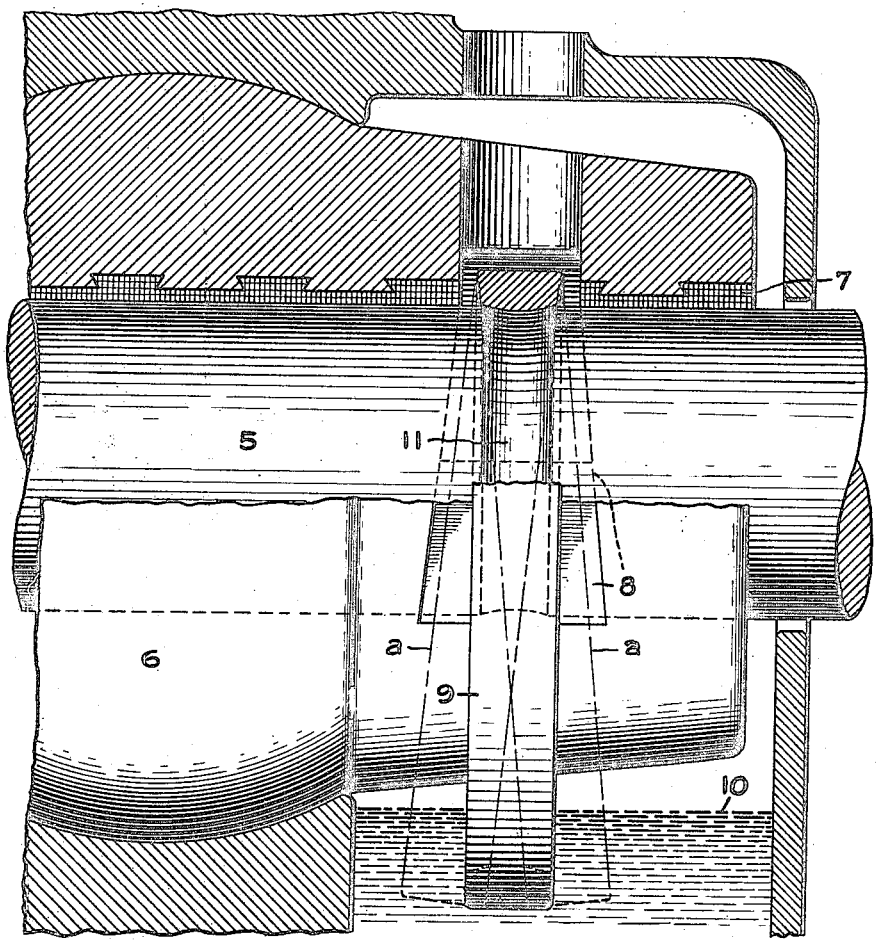

JAMES WILKINSON, OF SCHENECTADY, NEW YORK, ASSIGNOR TO GENERAL ELECTRIC COMPANY, A CORPORATION OF NEW YORK.

SHAFT BEARING.

1,426,936.  Specification of Letters Patent.  Patented Aug. 22, 1922.

Application filed August 9, 1920. Serial No. 402,265.

*To all whom it may concern:*

Be it known that I, JAMES WILKINSON, a citizen of the United States, residing at Schenectady, in the county of Schenectady, State of New York, have invented certain new and useful Improvements in Shaft Bearings, of which the following is a specification.

The present invention relates to shaft bearings and particularly to bearings which employ oil rings for lubricating purposes, the rings hanging on the shaft and dipping down into a chamber of lubricant. In such arrangements the efficiency of the lubrication depends upon the oil ring being continuously caused to rotate by the shaft and carry lubricant up to the shaft.

In certain machine applications, for example, in machinery used on shipboard, the shaft axles do not remain horizontal at all times but are tilted from the horizontal with the pitching and rolling of the ship, and the object of my invention is to provide an improved arrangement of bearing and oil ring in which the functioning of the oil ring will not be disturbed or interfered with due to the shaft moving from the horizontal.

For a consideration of what I believe to be novel and my invention, attention is directed to the accompanying description and the claim appended thereto.

In the drawing, the figure is a side elevation partly in section of a bearing provided with an oil ring arrangement embodying my invention.

Referring to the drawing, 5 indicates a shaft carried in a bearing 6, the bearing lining being indicated at 7. In the upper portion of the bearing is a groove 8 in which an oil ring 9 runs. This groove, as is usual, provides openings through the sides of the bearing through which the oil ring projects, the lower portion of the ring running in a supply of lubricant indicated at 10. As is well understood, rotation of shaft 5 causes ring 9 to run in a circle with the result that it carries lubricant up over the shaft.

Now, according to the embodiment of my invention, as illustrated in the drawing, I provide the shaft with an annular rounded groove 11 in which oil ring 9 runs, the oil ring being perfectly convex on its inner surface so as to conform to the contour of groove 11. This serves to hold the oil ring from shifting axially on shaft 5, and forms a sort of pivot on which the ring can swing. I then make groove 8 of such size that ring 9 can swing axially on the shaft a reasonable amount without coming in contact with the edge of the groove. For this purpose I preferably make groove 8 flared, as shown, it being narrowest at the top and widest at the bottom, the flare being such as to permit of the desired swinging movement of ring 9 without the ring coming into contact with the walls of the ring groove 8.

With the foregoing arrangement it will be clear that when shaft 5 takes a position at an angle to the horizontal such as might be occasioned by the pitching or rolling of a ship, oil ring 9 may swing on shaft 5 as a pivot, as indicated by the dot and dash lines marked *a*, and will not travel axially on the shaft or come into contact with the walls of oil ring groove 8. Its usual functioning will not therefore, be interfered with.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

The combination of a shaft provided with a rounded annular groove formed directly in its surface, a bearing therefor having a flared oil ring groove, and an oil ring having a rounded inner wall hung in the groove in the shaft and located in said flared groove whereby such oil ring is held from axial movement along the shaft but may swing on the shaft without coming into engagement with the walls of said flared groove.

In witness whereof, I have hereunto set my hand this 6th day of August 1920.

JAMES WILKINSON.